(12) United States Patent
Dos Reis

(10) Patent No.: US 11,935,375 B2
(45) Date of Patent: Mar. 19, 2024

(54) STRUCTURAL ARRANGEMENTS APPLIED TO A REMOTE MONITORING AND SECURITY SYSTEM

(71) Applicant: HELPER TECNOLOGIA, Colombo (BR)

(72) Inventor: Rogério Alberto Dos Reis, Curitiba (BR)

(73) Assignee: HELPER TECNOLOGIA, Colombo (BR)

( * ) Notice: Subject to any disclaimer, the term of this patent is extended or adjusted under 35 U.S.C. 154(b) by 327 days.

(21) Appl. No.: 17/413,852

(22) PCT Filed: Oct. 30, 2019

(86) PCT No.: PCT/BR2019/050472
§ 371 (c)(1),
(2) Date: Jan. 18, 2022

(87) PCT Pub. No.: WO2020/118394
PCT Pub. Date: Jun. 18, 2020

(65) Prior Publication Data
US 2022/0139181 A1    May 5, 2022

(30) Foreign Application Priority Data

Dec. 12, 2018 (BR) .......................... 202018075847-6

(51) Int. Cl.
*G08B 13/196*    (2006.01)
*H04N 23/51*    (2023.01)

(52) U.S. Cl.
CPC . *G08B 13/19619* (2013.01); *G08B 13/19632* (2013.01); *H04N 23/51* (2023.01)

(58) Field of Classification Search
CPC ........ G08B 13/19619; G08B 13/19632; G08B 19/00; H04N 23/51
See application file for complete search history.

(56) References Cited

U.S. PATENT DOCUMENTS 7,703,996 B1 *  4/2010  Sexton, Jr. ............... G03B 5/00
                                                         248/218.4
2004/0179093 A1 *  9/2004  Inan .................... G08B 13/1963
                                                         348/36

(Continued)

*Primary Examiner* — Amy R Hsu
(74) *Attorney, Agent, or Firm* — DITTHAVONG, STEINER & MLOTKOWSKI

(57) ABSTRACT

This patent for the utility model of constructive provisions introduced in a remote monitoring and security system built in accordance with patents PI0903795-0 and BR102013011905 9 of the same inventor, applied in the area of public or private security and with the purpose of being an electronic policing station for monitoring and remote security of delimited areas, with chassis (1), internal structure (2) and monitoring set (3) that presents functional and constructive improvements in the conception of a miniaturized set with advantages of greater ease of use. deployment because it is not self-supporting, allowing its attachment to existing structures, such as poles and walls, low manufacturing cost, low maintenance cost, use of several units with the same investment, increasing safety by the greater concentration of posts and maintaining the same level of perception of safety and improved monitoring.

2 Claims, 5 Drawing Sheets

(56) References Cited

U.S. PATENT DOCUMENTS

Figure 1:
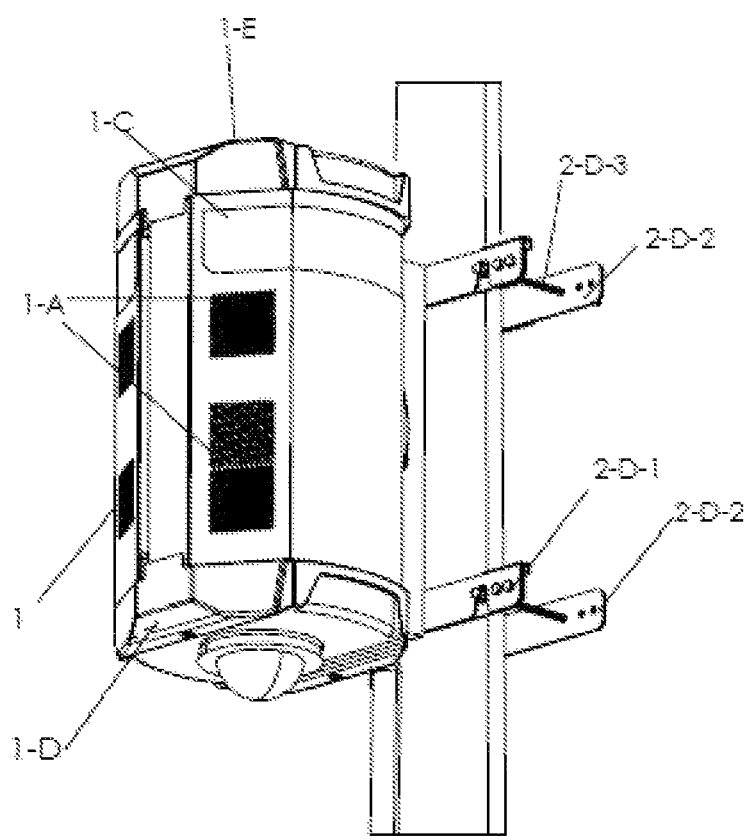

| | | | |
|---|---|---|---|
| 2008/0231707 A1* | 9/2008 | Fontana | G08B 13/19632 348/158 |
| 2014/0267715 A1* | 9/2014 | Kemege | H04N 23/50 348/143 |
| 2015/0161860 A1* | 6/2015 | Pringle | G08B 13/19632 348/143 |
| 2017/0142374 A1* | 5/2017 | Berg | G08B 13/19621 |
| 2019/0088096 A1* | 3/2019 | King | G08B 13/19665 |

* cited by examiner

STRUCTURAL ARRANGEMENTS APPLIED TO A REMOTE MONITORING AND SECURITY SYSTEM

This utility model patent refers to constructive provisions introduced in a remote monitoring and security system built in accordance with patents PI0903795-0 and BR102013011905 9 of the same inventor, applied in the area of public or private security and with the purpose of being an electronic policing station for monitoring and remote security of delimited areas, with innovative mechanical and electronic constructions that presents functional and constructive improvements in the design of a miniaturized set with advantages of greater ease of implementation as it is not self-supporting, allowing its attachment to existing structures, such as poles and walls, low manufacturing cost, low maintenance cost, low implementation cost, use of a greater number of units with the same investment, increasing security by the greater concentration of posts and maintaining the same level of security perception and improved monitoring and security by the drone base.

As it is known in the technical means linked to the manufacture and use of remote monitoring and security systems, the following solutions currently exist:

Brazilian patent BR 10 2013 011905 9, from the same inventor, which reveals a remote monitoring and security system that, according to its characteristics, provides the formation of a monitoring and security system in its own specific structure of the electronic type based on a monitoring center and a set of electronic modules or remote totems communicating through any means of communication, with a view to enabling extremely practical, safe and precise, a complete optimization in the set of procedures for monitoring and remote security of delimited public or private areas, as well as responding to emergency situations and generating well-being for people and, based on a monitoring system and security with great strength, security and versatility adaptable to a wide range of agencies and security companies, monitoring, protections, information, locations and users in general.

Brazilian patent PI0903795-0, by the same inventor, which reveals a mobile and autonomous equipment used in the law enforcement, calls for emergency care and remote monitoring by recording images, videos and issuing data. It is characterized by being able to produce, by itself, moral effect, in order to transmit to the population the reliability of an effective local security system, a police presence or patrol service that is efficient or even simply because of its simple presence, serve as an instrument to repress crime and aid in emergency calls that require urgent intervention by public or private security agencies, responding to calls for help such as assaults, pursuits, medical emergencies, traffic accidents, fires, catastrophes, etc. The equipment is provided with image capture, audio and data emission devices, devices for recording and local analysis of videos and data, device for online video, audio and data transmission through the data networks of telephone, satellite, operators, wireless data networks, fiber optic data networks, metallic pair, or other means that do the job. It is also provided with warning systems with lights and sirens, emergency button, bidirectional audio capture device, system of powerful speakers, intelligent video, audio and data analysis software.

These solutions have disadvantages, inconveniences and limitations of:
a) Implantation, as it is self-supporting and requires a base for fixation;
b) High manufacturing cost;
c) High maintenance cost; and
d) High implementation cost.

"STRUCTURAL ARRANGEMENTS APPLIED TO A REMOTE MONITORING AND SECURITY SYSTEM" object of this patent, was developed to overcome the limitations, inconveniences and disadvantages of current remote monitoring and security systems, because through mechanical and electronic constructiveness it presents functional and constructive improvement in the conception of a miniaturized electronic police station module specially designed with the same current functions of being able to produce, by itself, moral effect, in order to transmit to the population the reliability of an effective local security system, a police service of presence or patrolling that is efficient or even that, by its simple presence, serves as an instrument to repress crime and aid in emergency calls that require urgent intervention by public or private security agencies, responding to calls for assistance such as robberies, chases, medical emergencies, traffic accidents, fires, catastrophes, etc., and incorporating a drone base, possibility of attaching to existing structures, bringing advantages of greater ease of deployment as it is not self-supporting, allowing attachment to existing structures, such as poles and walls, low manufacturing cost, low maintenance cost, low implementation cost, use of a greater number of units with the same investment, increasing security due to the greater concentration of stations, maintaining the same level of security perception and improving monitoring and security through the drone base.

Technical problems that the foregoing does not solve and how it was solved by the system of this patent:
A) It needs a base for installation as it is self-supporting, resolved by the present patent for presenting a constructive structure that uses a post or wall for fixation;
B) It does not have a base for a drone, limiting the monitoring and security of the area covered by the posts, resolved by this patent for presenting a structure with a base for a drone.

Figure 2:
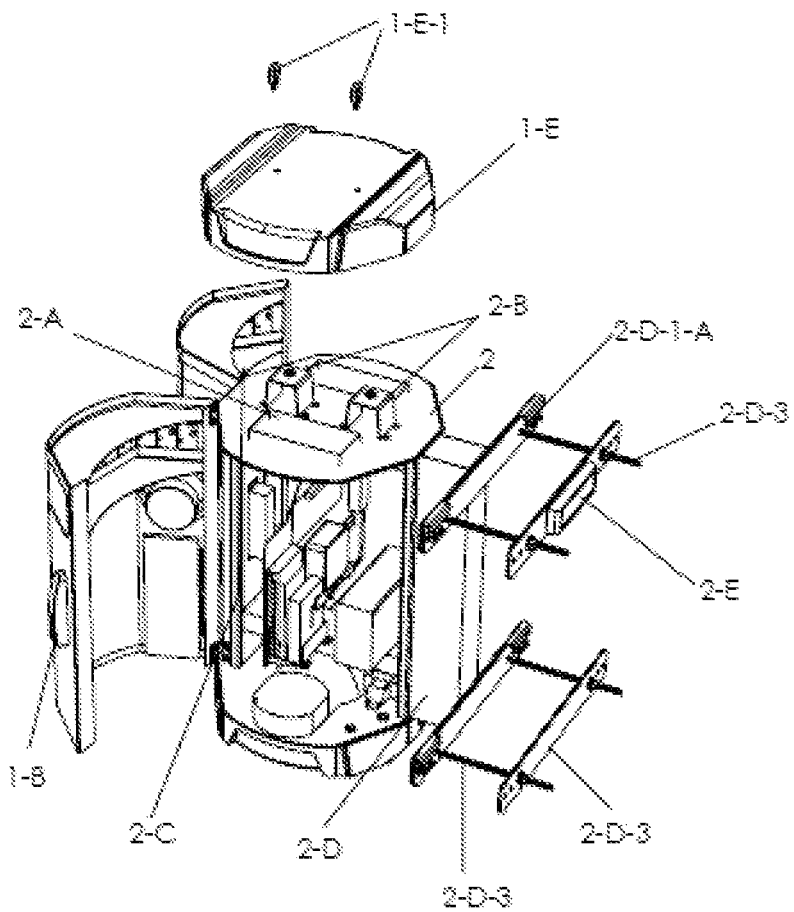
Figure 3:
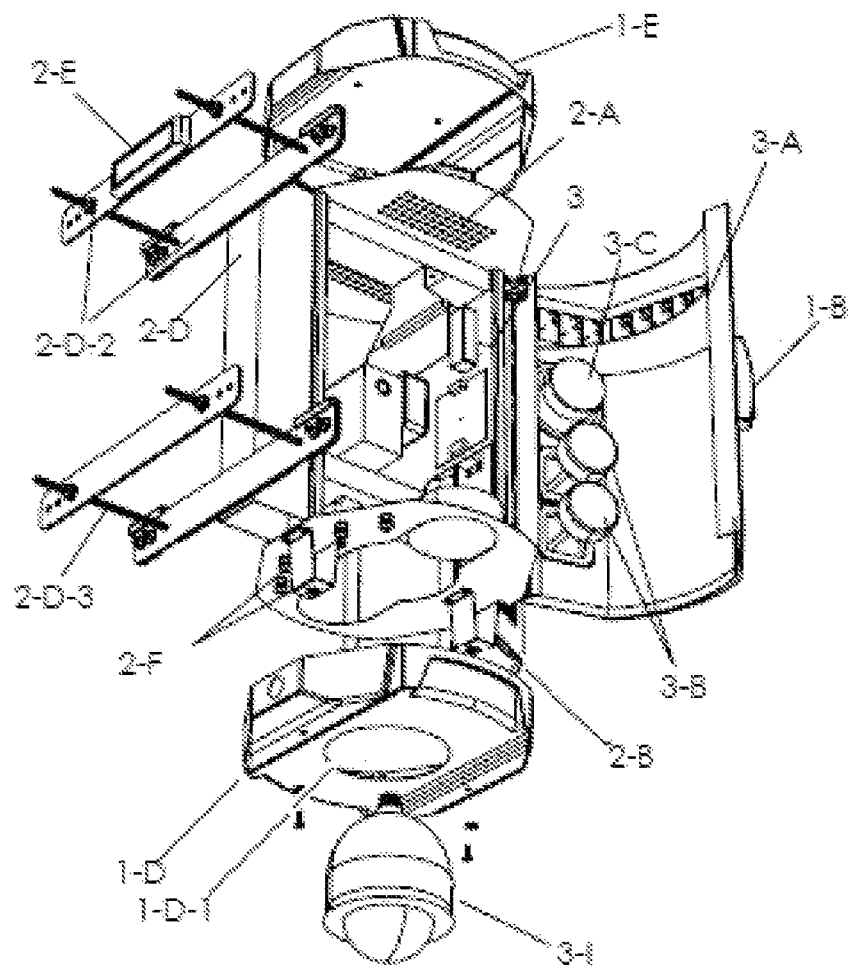
Figure 4:
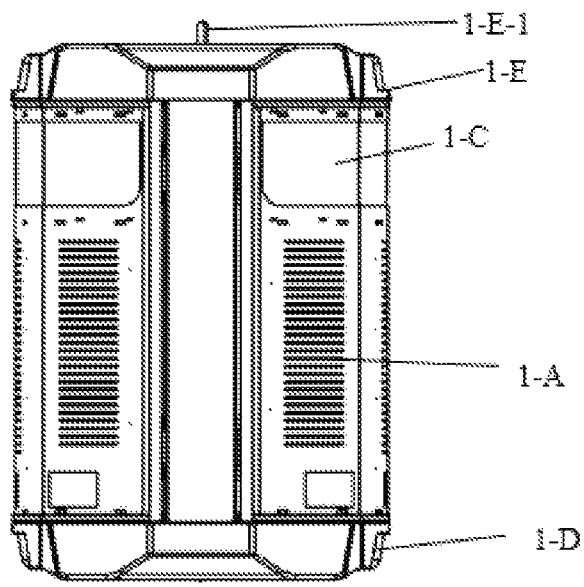
Figure 5:
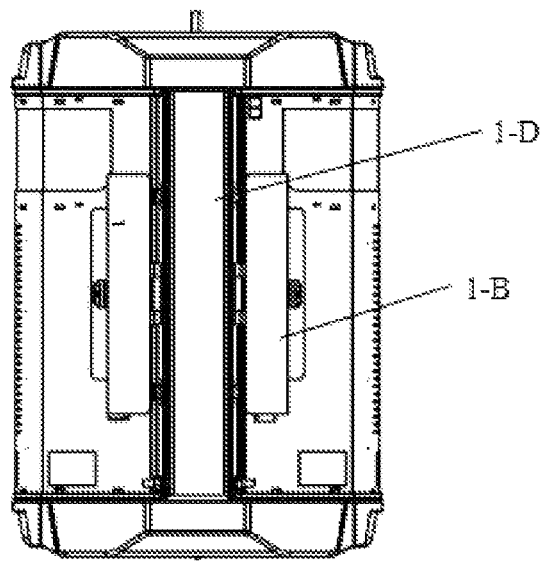
Figure 6:
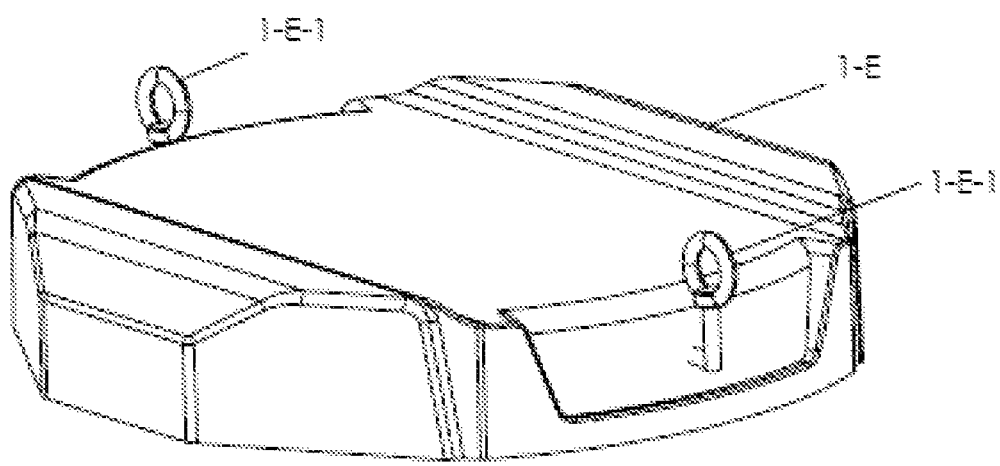

For a better understanding of the present invention, the following drawings are attached:

FIG. 1., which shows the perspective view of the monitoring system mounted on the pole, object of this patent;

FIG. 2., which shows the upper rear perspective view of the open chassis of the monitoring system of this patent;

FIG. 3., which shows the lower rear perspective view of the exploded chassis of the monitoring system of the present patent;

FIG. 4., which shows the front view of the closed chassis of the monitoring system of this patent;

FIG. 5., which shows the rear view of the closed chassis of the monitoring system of the present patent; and FIG. 6., which shows the perspective view of the top cover in the option to use it as a drone base.

According to the figures mentioned, the security system, object of the present patent consisting of a monitoring set (3) fixed on the inside of the internal structure (2) with central processing unit with embedded computer program, with memory, with supervision board/control, with Ethernet-type communication module, with cooling cooler, with giroflex equipped with LED board (3-A), with horn sirens (3-B), with speaker (3-C), with speed dome camera (3-D), with infrared cannon, with switch, with electrical protection, with batteries, with nobreak and with sensors for vandalism, temperature, air humidity, air pollution, vehicles and people, among others, characterized by chassis (1) of polygonal, cylindrical or ellipsoidal prismatic shape, with outlets for breathing and audio (1-A), with air filter (1-A-1), with handles (1-B), with viewfinder (1-C) for giroflex (3-F), with bottom cover (1-D) of polygonal, cylindrical or ellipsoidal prismatic shape of the bottom hole (1-D-1) of circular shape to fit the speed dome camera (3-I), with top cover (1-E) of polygonal, cylindrical or ellipsoidal prismatic shape with rectangular recess on the upper part provided with eyebolts (1-E-1) fixed to the lifting brackets (2-B) and fixed to the internal structure (2) through joints; internal structure (2) of compatible format for fitting and closing the chassis (1), with air vents (2-A) of rectangular shape with circular holes in the upper part of the structure (2), with lifting brackets (2-B) in inverted "U" shape with hole in the upper part of the structure (2) for fitting the screws (1-E-1), circuit support (2-C) of rectangular prismatic shape positioned vertically inside the structure to fixing the monitoring set (3), fixing structure (2-D) with monitoring (3), fixing structure (2-D) of polygonal profile shape fixed to the external rear of the structure (2) equipped with supports for crosspieces (2-D-1) of rectangular shape with positioning tabs (2-D-1-A) and holes for fitting and fastening, clamping crossbars (2-D-2) of rectangular shape with holes for slotting and fastening, screws (2-D-3) of the endless thread type inserted in the holes of the crossbars (2-D-2) and external LED housing (2-E) of rectangular shape with LED display and fixed to the rear of the clamping crossbars (2-D-2), channels (2-F) of cylindrical shape for passage of cables and fixed to the lower cover (1-D) of the internal structure (2).

Alternatively, the top cover (1-E) can be used as a drone base, for that the screws (1-E-1) will be moved to the edges of the top cover (1-E) (see FIG. 6).

The drone base will serve as a structure for landing and taking off drones, charging batteries; transfer of images (photos and videos) and data captured by the drone, fiber optic communication network point or radio system for transmission of images and data collected by the drone to a control center and/or to a "cloud" system, point of radio signal repetition responsible for the operationalization of the drone's flight.

The monitoring system of the present patent is assembled in the following sequence:
1. Initially, the internal structure (2) is assembled;
2. Fits the chassis (1) to the internal structure (2);
3. Set the sealing rubbers;
4. The display (1-C) is fixed on the inside of the chassis (1);
5. Air filters and refrigeration systems are assembled in general;
6. Assemble the monitoring set (3);
7. The module (1) is mounted on the pole or wall;
8. Assemble the top cover (1-E) and the bottom cover (1-D); and
9. Connects to electricity and communication network.

The invention claimed is:

1. "STRUCTURAL ARRANGEMENTS APPLIED TO A REMOTE MONITORING AND SECURITY SYSTEM", consisting of a monitoring set (3) fixed on the inside of the internal structure (2) with central processing unit with embedded computer program, with memory, with supervision board/control, with Ethernet-type communication module, with cooling cooler, with giroflex equipped with LED board (3-A), with horn sirens (3-B), with speaker (3-C), with speed dome camera (3-D), with infrared cannon, with switch, with electrical protection, with batteries, with nobreak and with sensors for vandalism, temperature, air humidity, air pollution, vehicles and people, among others, characterized by chassis (1) of polygonal, cylindrical or ellipsoidal prismatic shape, with outlets for breathing and audio (1-A), with air filter (1-A-1), with handles (1-B), with viewfinder (1-C) for giroflex (3-F), with bottom cover (1-D) of polygonal, cylindrical or ellipsoidal prismatic shape of the bottom hole (1-D-1) of circular shape to fit the speed dome camera (3-I), with top cover (1-E) of polygonal, cylindrical or ellipsoidal prismatic shape with rectangular recess on the upper part provided with eyebolts (1-E-1) fixed to the lifting brackets (2-B) and fixed to the internal structure (2) through joints; internal structure (2) of compatible format for fitting and closing the chassis (1), with air vents (2-A) of rectangular shape with circular holes in the upper part of the structure (2), with lifting brackets (2-B) in inverted "U" shape with hole in the upper part of the structure (2) for fitting the screws (1-E-1), circuit support (2-C) of rectangular prismatic shape positioned vertically inside the structure to fixing the monitoring set (3), fixing structure (2-D) with polygonal fixed profile format on the external rear part of the structure (2) equipped with supports for crossmembers (2-D-1) of rectangular shape with positioning tabs (2-D-1-A) and holes for fitting and fixing, clamping crossbars (2-D-2) rectangular in shape with holes for fitting and fastening, screws (2-D-3) of worm thread type inserted in the holes of the crossmembers (2-D-2) and external LED box (2-E) rectangular in shape with LED display and fixed to the rear of the clamping crossbars (2-D-2), channels (2-F) of cylindrical shape for the passage of cables and fixed to the lower cover (1-D) of the structure internal (2).

2. "STRUCTURAL ARRANGEMENTS APPLIED TO A REMOTE MONITORING AND SECURITY SYSTEM", according to claim 1, characterized in that, alternatively, the top cover (1-E) is used as a drone base, for this the screws (1-E-1) will shift to the edges of the top cover (1-E).

* * * * *